Patented Aug. 7, 1951

2,563,206

UNITED STATES PATENT OFFICE 2,563,206

CYCLOHEXENE CARBOXYLIC ACID ESTERS
AND PROCESS FOR PREPARING SAME

Ernst Bergmann, London, England, assignor to Polymerisable Products Limited, London County, England, a British company No Drawing. Application December 23, 1946,
Serial No. 718,110

11 Claims. (Cl. 260—468)

It has been known since the fundamental work of Diels and Alder that dienes, such as butadiene or isoprene condense with unsaturated acids and their derivatives such as esters or nitriles to form hydroaromatic systems of the general formula

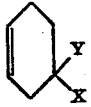

If the philodienic component (the reactant which combines with butadiene or isoprene) belongs to the very simplest aliphatic unsaturated substances such as derivatives of acrylic or methacrylic acid, high molecular rubber-like condensation products are formed.

The present invention covers a process for the production of the simple hydroaromatic condensation products from butadiene or isoprene with the derivatives of acrylic or methacrylic acid, in such a manner that the formation of polymeric products (high polymers) is suppressed.

The invention thus includes a process which consists more specifically in the synthesis of the nitrile of 3-cyclohexene-carboxylic acid

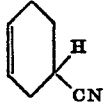

and the nitrile of 1-methyl-3 cyclohexene-carboxylic acid

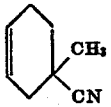

and the esters of these acids, and similar derivatives, by condensation of butadiene or isoprene, respectively, with the nitriles or esters of acrylic or methacrylic acid.

The present invention also includes the preparation of the nitrile of tetra-hydro-benzoic acid and similar bodies (without polymerizing the same) by the aforesaid components in the presence of a polymerisation inhibitor of the group consisting of phenols and polyphenols, their alkyl derivatives and tannic acid and trinitrobenzene.

If butadiene, e. g. and acrylonitrile are heated to a temperature of 100–180° C. in a closed vessel in presence of an inhibitor of polymerization such as hydroquinone or tert. butyl-catechol, and the product of the reaction is fractionated, good yields of the nitrile of tetra-hydro-benzoic acid are obtained. Whilst the formation of high-polymer products is prevented by the addition of the polymerisation inhibitor, the purely thermal homogeneous dimerisation of butadiene to vinyl-cyclohexene is unaffected by such additive agents, and indeed, certain quantities of this hydrocarbon will be present in the reaction product and can be separated by the fractional distillation. However, it is possible to reduce the formation of this dimeride to a minimum by using the acrylonitrile in an excess, so that its reaction with butadiene occurs at a greater speed than the reaction (condensation) of one butadiene molecule with another.

The present invention includes, therefore, a process according to which butadiene or isoprene are heated together with a substantial excess of the nitrile or an ester of acrylic or methacrylic acid, in the presence of a polymerisation inhibitor of the aforementioned group, at a temperature of 100–180° in a closed vessel for a suitable period of time, followed by the isolation of the desired reaction product by fractional distillation.

Butadiene can be condensed not only with acrylonitrile but also with the nitrile of methacrylic acid or with esters of acrylic acid or methacrylic acid such as the methyl or the 2-ethyl-hexyl ester or numerous others. The products so obtained are liquids, sometimes exhibiting pleasant odors, which contain one double bond which lends itself easily to hydrogenation to give the corresponding cyclohexane derivatives.

The nitrile and the ester groups can be hydrolysed in the conventional manner and the corresponding acids thus become easily available. The cyclohexene derivatives are capable of the normal reactions of acids of that structure, e. g. esterification with mono- and polyvalent alcohols. In this way, the diester of 3-cyclohexene-carboxylic acid with ethylene glycol, having the formula

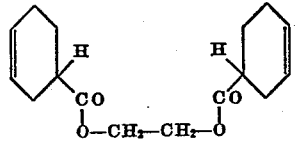

the (secondary) mono-ester of 3-cyclohexene-carboxylic acid with 3.5-dimethyl-hexane-2.3-diol, having the structure

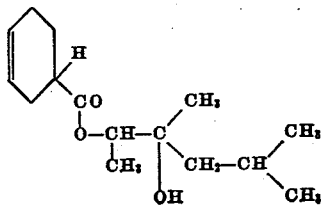

the (secondary) monoesters of 1-methyl-3-cyclohexene-carboxylic acid with that glycol

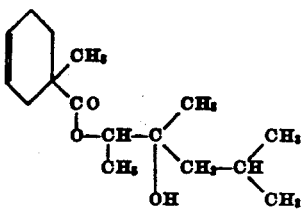

and with trimethyl glycol

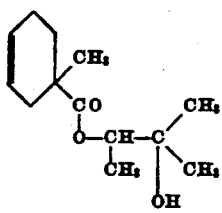

respectively, and the mono- and di-ester of 1-methyl-3-cyclohexene-carboxylic acid with ethylene glycol were prepared, namely,

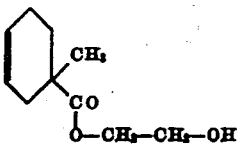

and

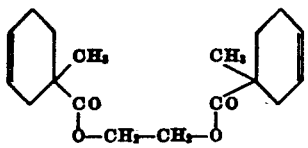

These acids can also be dehydrogenated to give benzene derivatives and oxidised with ring fission to carboxy-derivatives of adipic acid or substituted adipic acids.

Examples

[All parts by weight, if not indicated otherwise]

Example 1.—79.5 parts acrylonitrile and 100 parts butadiene and 5 parts hydroquinone were heated at 120° for 4 hours. Distillation of that reaction product gave:

(a) 3.5 parts acrylonitrile.
(b) 5 parts 130–150°, vinyl-cyclohexene (literature: B. P. 138°/760 mm.)
(c) 125 parts of the desired nitrile, B. P. 58–59°/4 mm.

The yield was 77%. The average yields in this condensation are 85–90%.

Hydrolysis of the nitrile.—88 parts of the nitrile were boiled for 16 hours with 65 parts potassium hydroxide, 160 parts methanol and 300 parts water. The solution was acidified and extracted with ether. 3-cyclohexene-carboxylic acid boils at 130–135°/20 mm.; B. P. 98–100°/6 mm.; yield, 70 parts=67%. Density, 1.112.; refractive index, 1.4799.

Analysis.—Calc. for $C_7H_{10}O_2$: C, 66.7; H, 8.0. Found: C, 66.5; H, 8.3.

Example 2.—Derivatives of 3-cyclohexene-carboxylic acid, esterification. 51 parts of the acid, 64 parts methyl alcohol and 3.6 parts concentrated sulphuric acid were boiled for 6 hours under reflux. The excess of methanol was distilled off and the residue treated with sodium carbonate solution and dried over calcium chloride.

Methyl 3-cyclohexene-carboxylate boiled at 116°/100 mm.; yield, 46 parts. Density 1.0163; refractive index, 1.4602.

Analysis.—Calc. for $C_8H_{12}O_2$: C, 68.6; H, 8.6. Found: C, 67.5; H, 8.6.

To 25.5 parts of the acid in 25 parts by volume chloroform, 71.4 parts thionyl chloride were slowly added. When the vivid reaction had subsided, it was completed by heating the mixture for 2 hours. B. P. of the acid chloride 95–97°/30 mm.; yield, 23 parts.

7 parts ethylene glycol, 28 parts methyl-3-cyclohexenoate and 2 parts sodium methoxide were heated in a bath of 130° C. temperature in a column, the head of which was kept at a temperature not exceeding 65°. Within 2 hours, 5.6 parts methanol collected in the receiver. Treatment with dilute sulfuric acid and ether gave an oil, which distilled under 8 mm. pressure at 155–160° and was the desired di-ester.

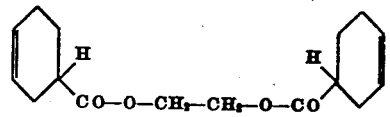

Yield, 21 parts=73%; density, 1.0912; refractive index, 1.4854.

The product would apparently be

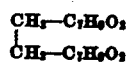

Analysis.—Calc. for $C_{16}H_{22}O_4$: C, 68.1; H, 9.2. Found: C, 67.5; 67.9; H, 9.2; 8.9.

11.5 parts 3.5-dimethyl-hexane-2.3-diol in 50 parts pyridine were added to 22.3 parts of the chloride of 2-cyclohexene-carboxylic acid in 37 parts chloroform. After 24 hours at room temperature, the mass was treated with dilute $H_2SO_4$, washed with sodium carbonate solution and the chloroform distilled off. B. P. of the monoester, fractive index, 1.4741.

Analysis.—Calc. for $C_{15}H_{26}O_3$: C, 70.9; H, 10.2. Found: C, 69.9; H, 10.0.

Example 3.—Butadiene and methyl methacrylate. 100 parts methyl methacrylate (1 mol), 75 parts butadiene (1.4 mol) and hydroquinone were heated at 150° for 5 hours. The product was twice fractionated at 100 mm. pressure.

(a) 45–60°: 24 parts; methyl methacrylate
(b) 66–67°: 17 parts; containing vinyl-cyclohexene
(c) 116–117°: 112 parts; density 0.9866; refractive index, 1.45815

Analysis.—Calc. for $C_9H_{14}O_2$: C, 70.1; H, 9.1. Found: C, 70.3; H, 10.1.

Yield, 73% or, calculated on the methyl methacrylate actually consumed, about quantitative. Product (c) is methyl 1-methyl-3-cyclohexene-carboxylate.

Example 4.—Butadiene and (2-ethyl-hexyl) methacrylate. 120 parts of the ester and 60 parts butadiene were heated with 10 parts tert. butyl-catechol as inhibitor at 120° for 8½ hours and the product was fractionated under 5 mm. pressure. The following fractions were secured:

(a) 69 parts octyl methacrylate
(b) 10 parts 100–125°, intermediate cut
(c) 26.8 parts 125–126°; density 0.9245; refractive index 1.4528.

The (2-ethyl-hexyl) 1-methyl-3-cyclohexene-carboxylate was obtained in 43% yield (calculated on the methacrylate entered into reaction).

Analysis.—Calc. for $C_{16}H_{30}O$: C, 76.2; H, 11.1;

bromine No. 75.5. Found: C, 76.2; H, 11.5; bromine No. 60.

Example 5.—1-methyl-3-cyclohexene-carboxylic acid and derivatives.

(a) 158.4 parts of the methyl ester were stirred with 100 parts potassium hydroxide in 80 parts methyl alcohol and 100 parts water. After 30 minutes of exothermic reaction, a clear solution had formed, which was boiled for 5 hours and acidified. The solid was freed from adhering potassium sulfate by washing with water (in which the acid is only sparingly soluble), dried and triturated with cold petroleum ether. Yield, 122 parts=86%; M. P. 77–79°.

(b) 21 parts of the 2-ethyl-hexyl ester were heated for 8 hours with a solution of 9 parts potassium hydroxide in 80 parts methanol. The product was steam-distilled, and from the distillate 9.6 parts 2-ethyl-hexanol were isolated (yield, 91%). The alkaline residue was acidified and the acid dried and recrystallised from ligroin. Prisms, M. P. 77–79°; yield 12 parts=quantitative.

Analysis.—Calc. for $C_8H_{12}O_2$: C, 68.6; H, 8.6. Found: C, 69.0; H, 9.2.

Acid chloride.—To 28 parts of the acid in 25 parts by volume chloroform, 71.4 parts thionyl chloride were slowly added. The sluggish reaction was completed by boiling for 2 hours. Distillation gave 22 parts, boiling at 100°/30 mm.

10 parts 3.5-dimethyl-hexane-2.3-diol in 50 parts pyridine were added to a solution of 22 parts of 1-methyl-3-cyclohexenoyl chloride in 25 parts by volume chloroform. The usual treatment gave 12.5 parts of the monoester, B. P. 125–130°/6 mm.; density, 1.0274; refractive index, 1.4669.

22 parts trimethyl glycol, 62 parts methyl 1-methyl-3-cyclohexeneoate and 2 parts sodium methoxide were heated in a column in a bath of 130° C. Within 8 hours, 4 parts methanol collected in the receiver. The mass was treated with dilute sulfuric acid and the product distilled repeatedly under 5 mm. pressure. 20.5 parts of the methyl ester were recovered unchanged. The desired mono-(1-methyl-3-cyclohexenoyl)-derivative of trimethyl-glycol had B. P. 105–110°/4 mm.; density, 1.0223; refractive index, 1.4690.

Analysis.—Calc. for $C_{13}H_{22}O_3$: C, 69.0; H, 9.7; bromine number, 71. Found: C, 69.0; H, 9.6; bromine number, 79.

6.2 parts ethylene glycol, 31 parts methyl 1-methyl-3-cyclohexeneoate and 2 parts sodium methoxide were heated at 130° bath temperature in a column. Within 4 hours, 5.6 parts methanol collected in the receiver. Treatment as above gave two fractions:

(a) 135–155°/5 mm.; 7.5 parts; mono-ester; density, 1.0614; refractive index, 1.4770
(b) 160–170°/5 mm.; 10 parts; di-ester; density, 1.0648; refractive index, 1.4844.

Analysis—Calc. for $C_{10}H_{16}O_3$: C, 65.2; H, 9.2; bromine number, 105; OH, 9.3. $C_{18}H_{26}O_4$: C, 70.6; H, 8.5; bromine number, 105; OH, 0. Found (a): C, 64.4; H, 8.7; bromine number, 90; OH, 7.4. (b): C, 70.5; H, 8.7.

The 2-alkyl-butadienes, isoprene and its homologs, will give mostly derivatives with the alkyl-group in para position, but as by-products, meta-compounds are formed. The operating conditions are the same for all these dienes.

If desired, instead of the 100 parts of butadiene in Example 1, 120 parts of isoprene can be used. The product thus formed is mainly the nitrile of 4-methyl-3-cyclohexene-carboxylic acid, but it contains usually certain amounts of the 3-methyl-compound. Dehydrogenation of this liquid product which boils at 68–69°/6 mm., leads to a mixture of m- and p-tolunitrile which can be separated from each other.

I claim:

1. A process of producing a product of the type

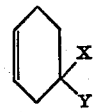

in which X represents a substance selected from the group consisting of hydrogen and methyl and in which Y represents a monovalent radical selected from the group consisting of —COO-alkyl and CN, which comprises heating a mixture consisting essentially of a diene containing 4 to 5 carbon atoms and an excess of a derivative of an unsaturated organic acid, selected from the group consisting of the nitriles and alkyl esters of acrylic acid and methacrylic acid, while in the presence of a polymerization inhibitor selected from the group consisting of phenols and polyphenols and their alkyl derivatives, tannic acid and trinitrobenzene, until a condensation of such two main components is effected.

2. A process of making an unpolymerized product of the type

in which X represents a substance selected from the group hydrogen and methyl and in which Y represents a monovalent radical selected from the group consisting of —COO-alkyl and —CN, which comprises heating at between 120° and 150° C., a mixture consisting essentially of 1 mol of a substance selected from the group consisting of the nitriles and low alkyl esters of acrylic and methacrylic acids, and more than 1 mol of a diene containing 4 to 5 carbon atoms, while having admixed therewith a minor fraction of dihydric phenol as an inhibitor of polymerization, such heating being continued for about 4 hours to about 10 hours, whereby the acrylic compound condenses with the diene.

3. A polyhydric alcohol ester of an acid having the general formula

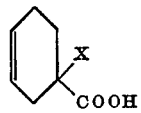

in which X is a substance selected from the group consisting of hydrogen and a methyl group such ester being in a substantially unpolymerized condition, and being non-resinous in character.

4. A monomeric polyhydric alcohol ester of methyl-cyclohexene-carboxylic acid.

5. A monomeric glycol ester of cyclohexene-carboxylic acid.

6. A monomeric glycol ester of methyl-cyclohexene-carboxylic acid.

7. A monomeric ester of cyclohexene-carboxylic acid with a glycol, said ester still containing one of the OH groups of the glycol, unesterified.

8. A monomeric ester of monomethyl-cyclohexene-carboxylic acid with a glycol, said ester still containing an OH group of the glycol, unesterified.

9. A monomeric ester of 3-cyclohexene carboxylic acid with 3.5 dialkyl hexane-2.3-diol.

10. A monomeric ester of 1-methyl-3-cyclohexene-carboxylic acid with a glycol selected from the group consisting of ethylene glycol, 3.5-dimethyl-hexane-2,3-diol and trimethyl glycol.

11. A mono-(1-methyl-3-cyclohexenoyl) ester of trimethyl-glycol.

ERNST BERGMANN.

REFERENCES CITED

The following references are of record in the file of this patent:

UNITED STATES PATENTS

| Number | Name | Date |
|---|---|---|
| 1,824,068 | Brooks | Sept. 22, 1931 |
| 2,017,070 | Lazier | Oct. 15, 1935 |
| 2,217,632 | Wolfe | Oct. 8, 1940 |
| 2,409,633 | Kropa | Oct. 22, 1946 |

FOREIGN PATENTS

| Number | Country | Date |
|---|---|---|
| 540,168 | Great Britain | Oct. 8, 1941 |

OTHER REFERENCES

Ser. No. 415,424, Hopff et al, (A. P. C.), published April 20, 1943.